Patented Apr. 15, 1952

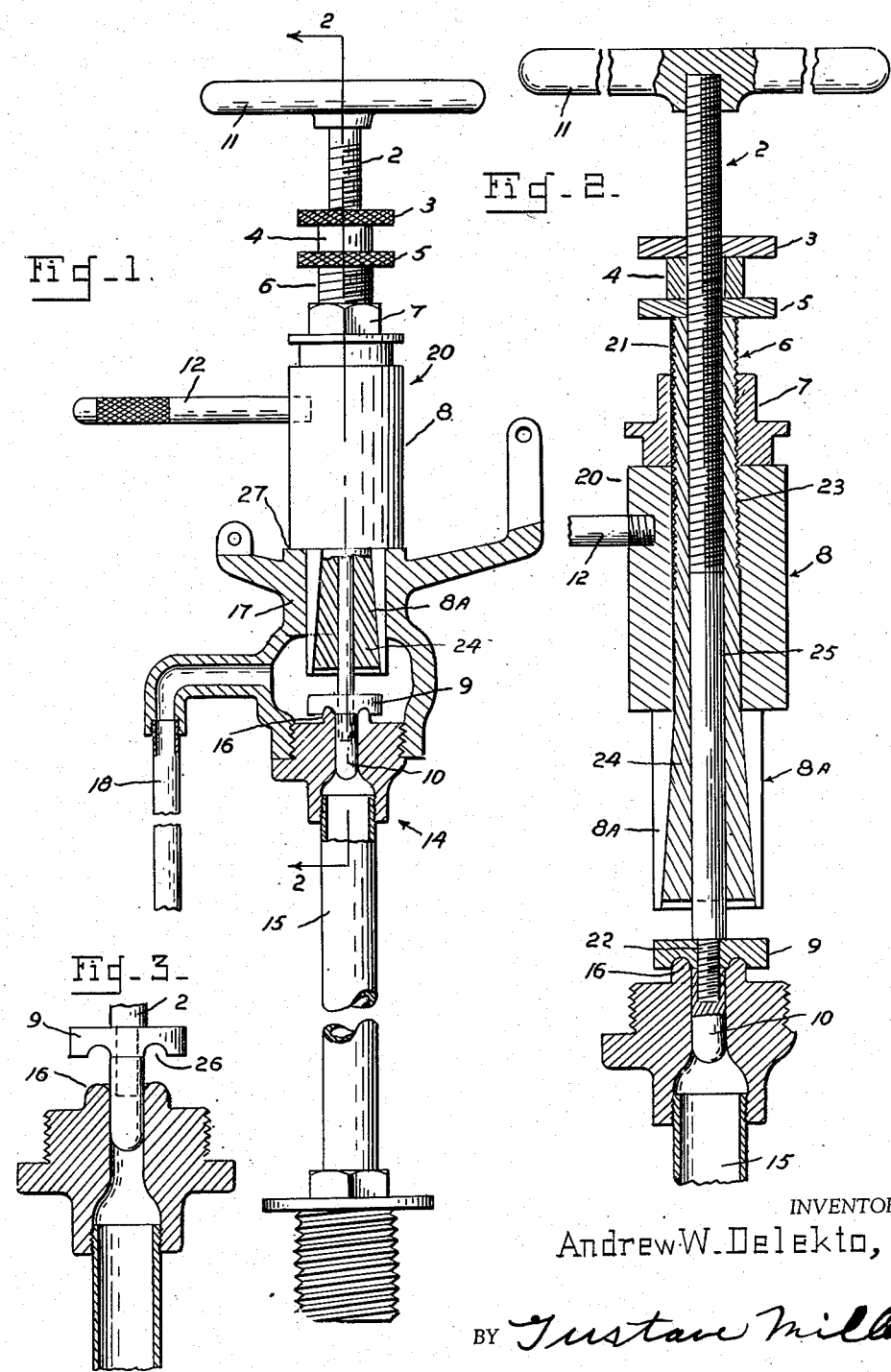

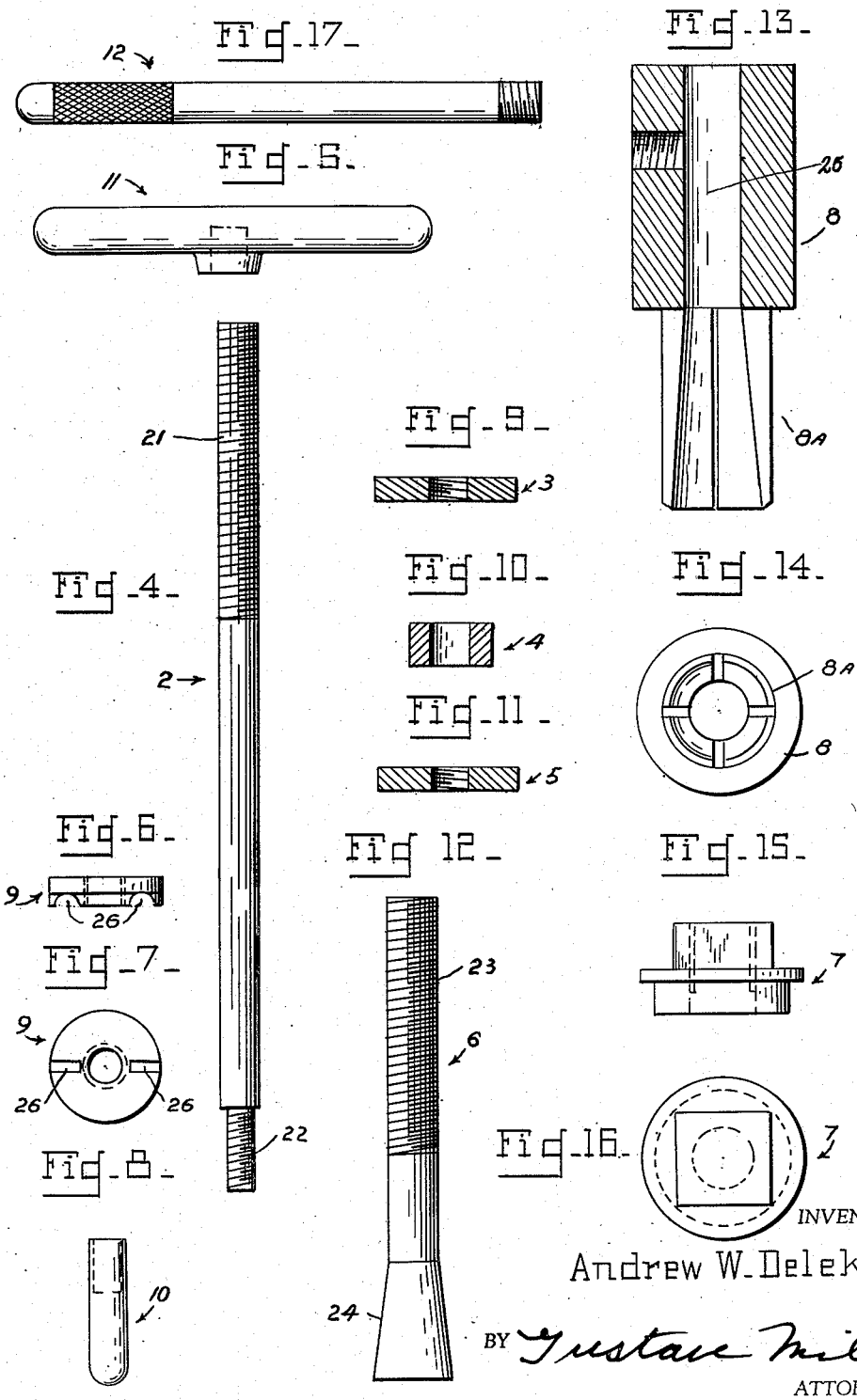

2,593,013

UNITED STATES PATENT OFFICE 2,593,013

BALL COCK RESEATING TOOL

Andrew William Delekto, Auburn, Maine

Application November 13, 1950, Serial No. 195,436

5 Claims. (Cl. 90—12.5)

This invention relates to a ball cock reseating tool, and has for an object to provide an improved ball cock reseating tool especially intended for reseating the seat of a ball cock valve while still in position in a toilet water box without the necessity of disrupting piping, connections or any securely fastened parts.

A further object of this invention is to provide an improved ball cock reseating tool which may be operated to properly cut or regrind the valve seat of a ball cock after merely removing the usual float plunger, together with its linkage, and then the tool is inserted into the plunger cylinder of the valve, readily and securing it therewithin, and then quickly and easily reseating the valve seat by merely rotating the tool handle a few turns under a moderate amount of pressure.

A further object of this invention is to provide a ball cock reseating tool which may be easily used in the usually confined area of a toilet water box with the valve seat in its usual operative position.

A further object of this invention is to provide a ball cock reseating tool to be used in position on a ball cock valve seat which is pitted or otherwise damaged so that the plunger valve does not seal thereagainst to prevent the flow of water.

With this invention it is not necessary to disturb any of the plumbing or to remove the valve seat itself, which is usually part of and permanently fixed to the plumbing, but instead the usual float, plunger and its valve, and its linkage is readily removed without disturbing the plumbing, whereupon complete access to the valve seat is provided for the operation of the tool of this invention.

With the foregoing and other objects in view, as will hereinafter become apparent, this invention comprises the combinations, constructions, and arrangement of parts hereinafter set forth, disclosed, claimed and illustrated in the accompanying drawings, wherein:

Fig. 1 is an elevational view of the ball cock reseating tool of this invention in operative position on a ball cock seat;

Fig. 2 is a sectional view on line 2—2 of Fig. 1, rotated 90°;

Fig. 3 is an enlarged detailed view showing how the cutter is properly guided onto the ball cock seat;

Fig. 4 is a plan view of the spindle;

Fig. 5 is an edge plan view of the spindle rotating handle;

Figs. 6 and 7 are edge and bottom plan views of the valve seat cutter;

Fig. 8 is a plan view of the pilot which secures the cutter on the spindle;

Fig. 9 is a partly sectional detailed view of the locking nut;

Fig. 10 is a sectional view of the spacing collar;

Fig. 11 is a partly sectional detailed view of the depth adjustment nut;

Fig. 12 is a plan view of the collet expanding taper sleeve;

Fig. 13 is a plan view of the collet;

Fig. 14 is a bottom view of the Fig. 13;

Figs. 15 and 16 are edge and top plan views of the collet expanding nut; and

Fig. 17 is a plan view of the collet body holding handle.

There is shown at 14 the usual plumbing found in the water box of a toilet, including the water inlet pipe 15 on which is mounted the ball cock valve seat 16 to which is secured the usual valve body cylinder 17 and the water discharge pipe 18. The usual float and plunger valve, together with its linkage, have been removed, such parts being normally fastened in position by easily removable cotter pins or other pivot pins and readily replaceable without disturbing any of the plumbing. In such position the plumbing 14 is readily available for cooperation with the ball cock reseating tool 20 of this invention, the reseating operation being performed when the ball cock valve seat 16 has become damaged or pitted so that the usual plunger valve no longer meets thereagainst to seal off the water from the water pipe 15 to the discharge pipe 18.

The ball cock reseating tool 20 of this invention consists of a spindle 2 provided at its upper end with a thread 21 and at its lower end with a reduced threaded neck 22, onto which is screwed the cutter 9 and then locked in position by means of the pilot 10 threaded on the lower end of the neck 22.

A hollow collet expanding taper sleeve 6 arranged to slidably fit over the spindle 2 is provided with an external thread 23 and taper 24 at its lower end. A collet body 8, having a longitudinal bore 25 arranged to just fit over the sleeve 6, is provided with depending collet fingers 8A. At rest, these collet fingers 8A have an outside diameter very slightly less than the inside diameter of the ball cock valve cylinder 17, and these fingers 8A are somewhat flexible and can have their outside diameter increased by moving the taper 24 of sleeve 6 upwardly therethrough, thus causing the fingers to grip tightly against the inside of cylinder 17. A collet expanding nut 7 threaded to screw on the thread 23 on sleeve 6 when tightened serves to draw the sleeve 6 upwardly and thus cause its taper 24 to operate the collet fingers 8A outwardly, the handle 12 secured in the collet body 8 serving to hold the collet body against rotation while the nut 7 is being tightened. The spindle 2 with cutter 9 held in the bottom end thereof by the pilot 10 may then be inserted upwardly through the assembled sleeve 6 and collet body 8, whereupon the depth of cut adjustment nut 5 is fitted down over the thread 21 of spindle 2; then the spacing collar 4 is placed over the thread 21 and next the lock nut 3, a substantial duplicate of nut 5, is threaded down over the thread 21 against the spacing collar 4, and then the operating handle or wheel 11 is threaded onto the end of thread 21 on spindle 2.

In order to use the ball cock reseating tool of this invention, the usual float, plunger valve and linkage are removed from the plumbing 14, the plumbing 14 remaining in position within the water box of the toilet, no plumbing connections being removed or disturbed whatsoever. After first backing off the lock nut 3 and the depth of adjustment nut 5 toward the operating handle 11 at the top and loosening nut 7, so that the taper 24 on sleeve 6 will not be in a position expanding the collet fingers 8A, the tool is inserted down through the cylinder 17 with the pilot 10 entering into the water passage through the ball cock valve seat 16, thus guiding the cutter 9 onto the seat 16. This cutter 9 is a formed cutter made to give the seat 16 the proper radius, as shown in Figs. 6 and 7. This cutter 9 is provided with at least two properly shaped cutter knives 26. With the collet fingers 8A extending into the cylinder 17 and the collet shoulder 27 resting on or adjacent the top of the cylinder 17, the nut 7 is tightened to draw the sleeve 6 upwardly thereby causing the sleeve taper 24 to expand the collet fingers 8A outwardly into firm holding contact with the inside of the cylinder 17. Next, the depth of cut adjusting nut 5 is tightened on the thread 21 of spindle 2 down against the top of sleeve 6 but allowing for the depth of cut necessary to reseat the valve seat 16 by stopping the nut 5 short of the top of sleeve 6 the distance that it is desired to cut the valve seat 16, this distance being so small that it is substantially impractical to illustrate such distance. Then the lock nut 3 is tightened to hold the adjusting nut 5 in proper position, the nut 3 pressing the spacing collar 4 thereagainst.

The tool is now ready for the reseating or cutting action, which is accomplished by merely rotating the handle 11 while simultaneously applying a slight downward pressure. This rotates the spindle 2 and thus rotates the cutter 9 against the valve seat 16, thus smoothing and regrinding this valve seat 16 to the desired proper contour. Only a few revolutions will be necessary and the seat will be then in perfect condition. The tool 20 is then easily removed by loosening the nut 7 while holding the collet holding handle 12, thus allowing the taper 24 on sleeve 6 to move downwardly to release the collet fingers 8A from their expanded position, thus releasing the tool from its gripping position within the cylinder 17 and allowing it to be removed upwardly and withdrawn. Thereafter the plunger valve, float and linkage are placed back in position ready for operation in the usual normal manner.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A ball cock reseating tool arranged to reseat a ball cock valve seat in operative position, said tool comprising a ball cock valve seat cutter, a spindle on which said cutter is mounted, a guide pilot threadedly secured to said spindle below said cutter and removably holding said cutter on said spindle, said guide pilot cooperating with the water opening through the valve seat, means for rotating said spindle to thereby rotate said cutter over the valve seat in a reseating operation, and means cooperating with the inside walls of the ball cock cylinder for aligning and holding said tool in the valve reseating position, said means comprising a collet through which said spindle extends, said collet including expandible means arranged to expand within and grip the inside walls of the ball cock cylinder, said expanding means comprising a plurality of flexible externally, smoothly curved collet fingers integral with and depending from said collet, a taper sleeve within said collet fingers about said spindle, and nut means threaded on said taper sleeve above said collet for drawing said taper sleeve upwardly in said collet against said collet fingers.

2. A ball cock reseating tool arranged to reseat a ball cock valve seat in operative position, said tool comprising a ball cock valve seat cutter, a spindle on which said cutter is mounted, a guide pilot threadedly secured to said spindle below said cutter and removably holding said cutter on said spindle, said guide pilot cooperating with the water opening through the valve seat, means for rotating said spindle to thereby rotate said cutter over the valve seat in a reseating operation, and means cooperating with the inside walls of the ball cock cylinder for aligning and holding said tool in the valve reseating position, said means comprising a collet through which said spindle extends, said collet including expandible means arranged to expand within and grip the inside walls of the ball cock cylinder, said expanding means comprising a plurality of flexible externally, smoothly curved collet fingers integral with and depending from said collet, a taper sleeve within said collet fingers about said spindle, and nut means threaded on said taper sleeve above said collet for drawing said taper sleeve upwardly in said collet against said collet fingers, and handle means for holding said collet against rotation while expanding said collet fingers.

3. A ball cock reseating tool arranged to reseat a ball cock valve seat in operative position, said tool comprising a ball cock valve seat cutter, a spindle on which said cutter is mounted, a guide pilot threadedly secured to said spindle below said cutter and removably holding said cutter on said spindle, said guide pilot cooperating with the water opening through the valve seat, means for rotating said spindle to thereby rotate said cutter over the valve seat in a reseating operation, and means cooperating with the inside walls of the ball cock cylinder for aligning and holding said tool in the valve reseating position, said means comprising a collet through which said spindle extends, said collet including expandible means arranged to expand within and grip the inside walls of the ball cock cylinder, said expanding means comprising a plurality of flexible externally, smoothly curved collet fingers integral with and depending from said collet, a taper sleeve within said collet fingers about said spindle, and nut means threaded on said taper sleeve above said collet for drawing said taper sleeve upwardly in said collet against said collet fingers, and cutter depth adjusting means on said spindle cooperating with the top of said taper sleeve.

4. A ball cock reseating tool arranged to reseat a ball cock valve seat in operative position, said tool comprising a ball cock valve seat cutter, a spindle on which said cutter is mounted, a guide pilot threadedly secured to said spindle below said cutter and removably holding said cutter on said spindle, said guide pilot cooperating with the water opening through the valve seat, means for rotating said spindle to thereby rotate said cutter over the valve seat in a reseating operation, and means cooperating with the inside walls of the ball cock cylinder for aligning and holding said tool in the valve reseating position, said means comprising a collet through which said spindle extends, said collet including expandible means arranged to expand within and grip the inside walls of the ball cock cylinder, said expanding means comprising a plurality of flexible externally, smoothly curved collet fingers integral with and depending from said collet, a taper sleeve within said collet fingers about said spindle, and nut means threaded on said taper sleeve above said collet for drawing said taper sleeve upwardly in said collet against said collet fingers, and cutter depth adjusting means on said spindle cooperating with the top of said taper sleeve, said cutter depth adjusting means comprising a nut threaded on said spindle, a spacing collar and a lock nut threaded on said spindle against said spacing collar and adjusting nut.

5. A ball cock reseating tool arranged to reseat a ball cock valve seat in operative position, said tool comprising a ball cock valve seat cutter, a spindle on which said cutter is mounted, a guide pilot threadedly secured to said spindle below said cutter and removably holding said cutter on said spindle, said guide pilot cooperating with the water opening through the valve seat, means for rotating said spindle to thereby rotate said cutter over the valve seat in a reseating operation, and means cooperating with the inside walls of the ball cock cylinder for aligning and holding said tool in the valve reseating position, said means comprising a collet through which said spindle extends, said collet including expandible means arranged to expand within and grip the inside walls of the ball cock cylinder, said expanding means comprising a plurality of flexible externally, smoothly curved collet fingers integral with and depending from said collet, a taper sleeve within said collet fingers about said spindle, and nut means threaded on said taper sleeve above said collet for drawing said taper sleeve upwardly in said collet against said collet fingers, and cutter depth adjusting means on said spindle cooperating with the top of said taper sleeve, said cutter depth adjusting means comprising a nut threaded on said spindle, a spacing collar and a lock nut threaded on said spindle against said spacing collar and adjusting nut, and handle means on the upper end of said spindle for rotating said spindle and said seat cutter and simultaneously applying pressure to said seat cutter.

ANDREW WILLIAM DELEKTO.

REFERENCES CITED

The following references are of record in the file of this patent:

UNITED STATES PATENTS

| Number | Name | Date |
|---|---|---|
| 1,384,116 | Blair | July 12, 1921 |
| 1,999,815 | Lake | Apr. 30, 1935 |
| 2,044,938 | Ferrell | June 23, 1936 |
| 2,106,173 | Hawker | Jan. 25, 1938 |

FOREIGN PATENTS

| Number | Country | Date |
|---|---|---|
| 158,129 | Great Britain | Feb. 3, 1921 |